H. PARTOLL.
BAKE OVEN.
APPLICATION FILED SEPT. 25, 1915.
1,334,115.
Patented Mar. 16, 1920.
4 SHEETS—SHEET 1.
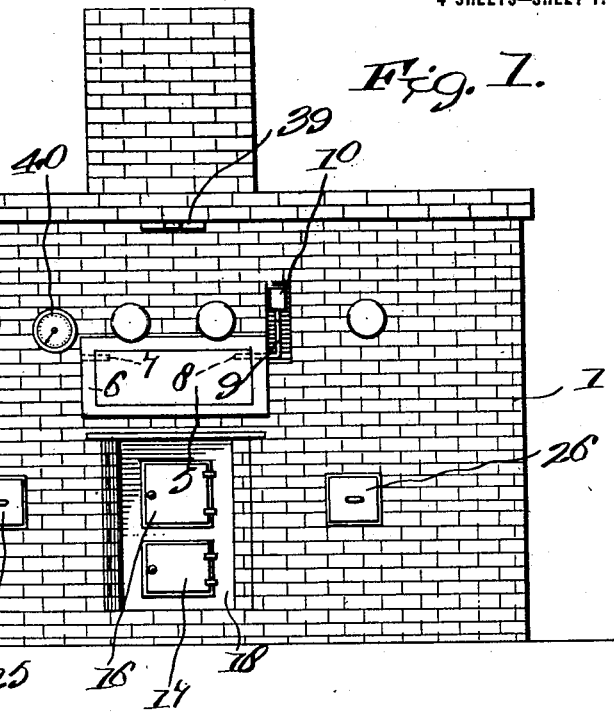
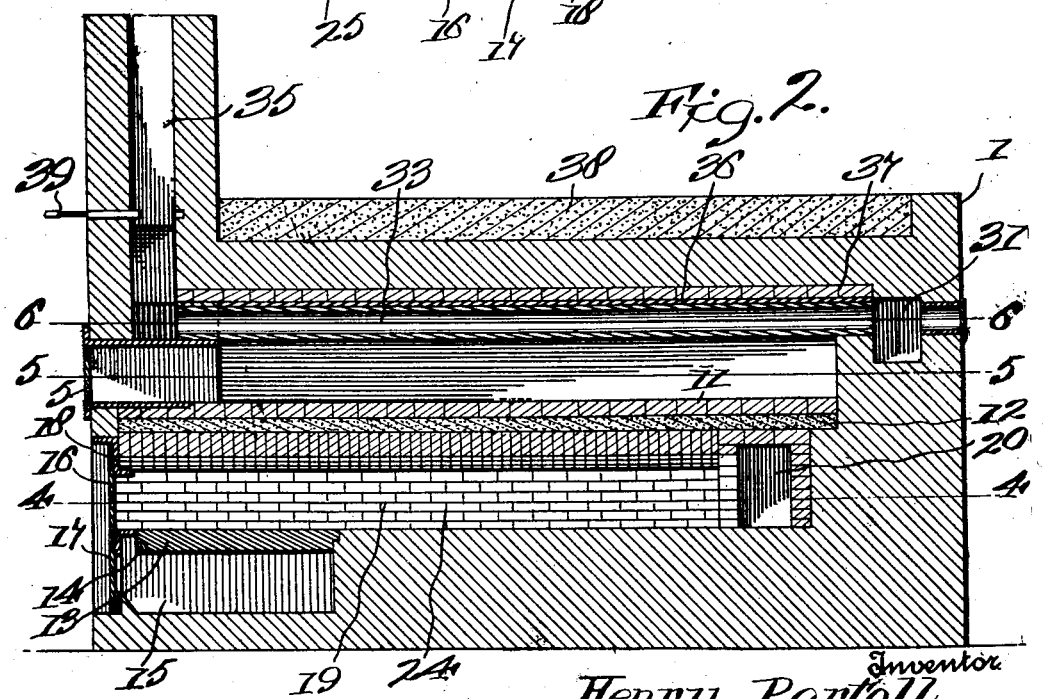

H. PARTOLL.
BAKE OVEN.
APPLICATION FILED SEPT. 25, 1915.
1,334,115.
Patented Mar. 16, 1920.
4 SHEETS—SHEET 2.
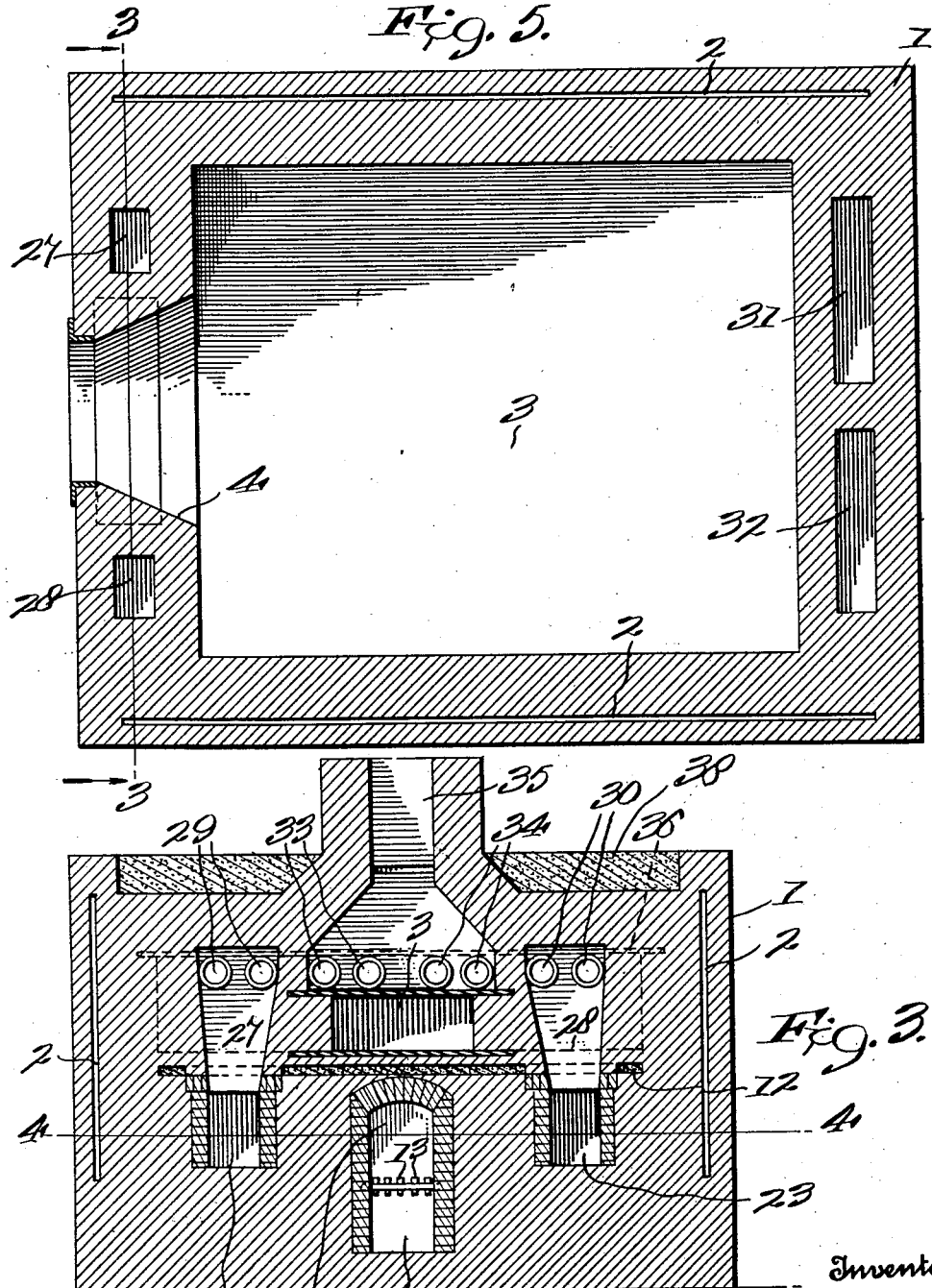

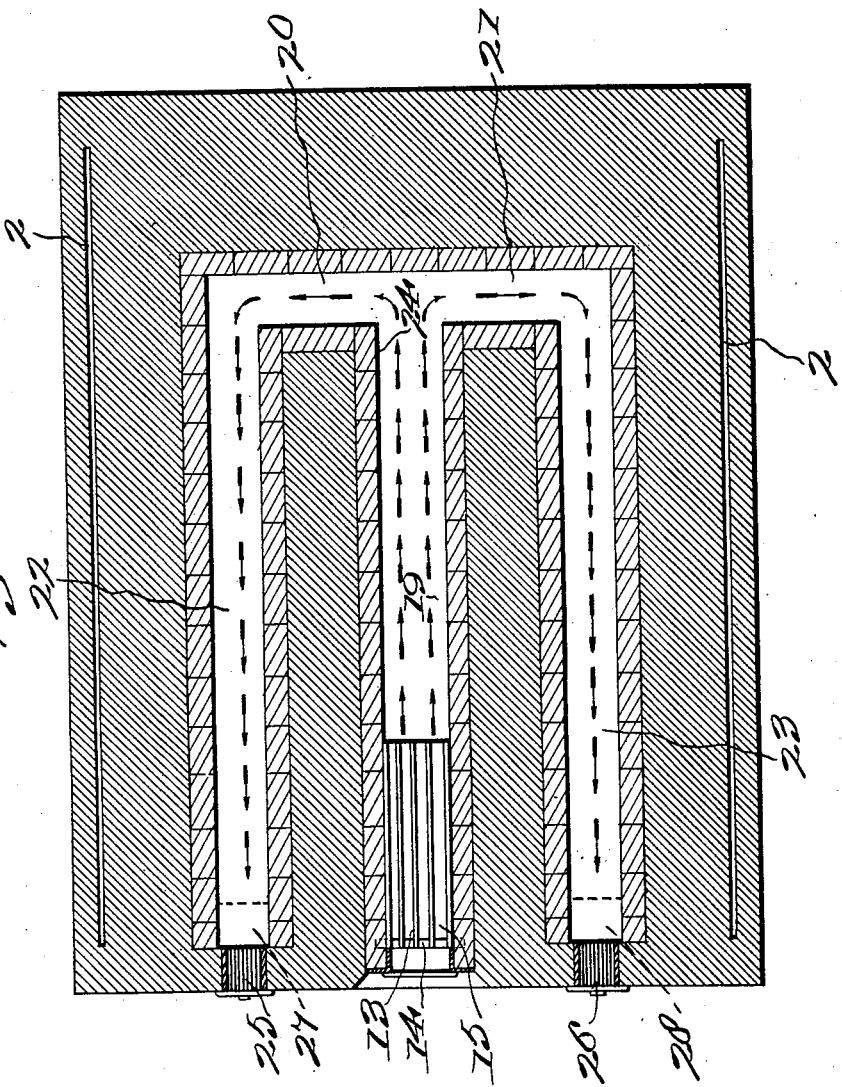

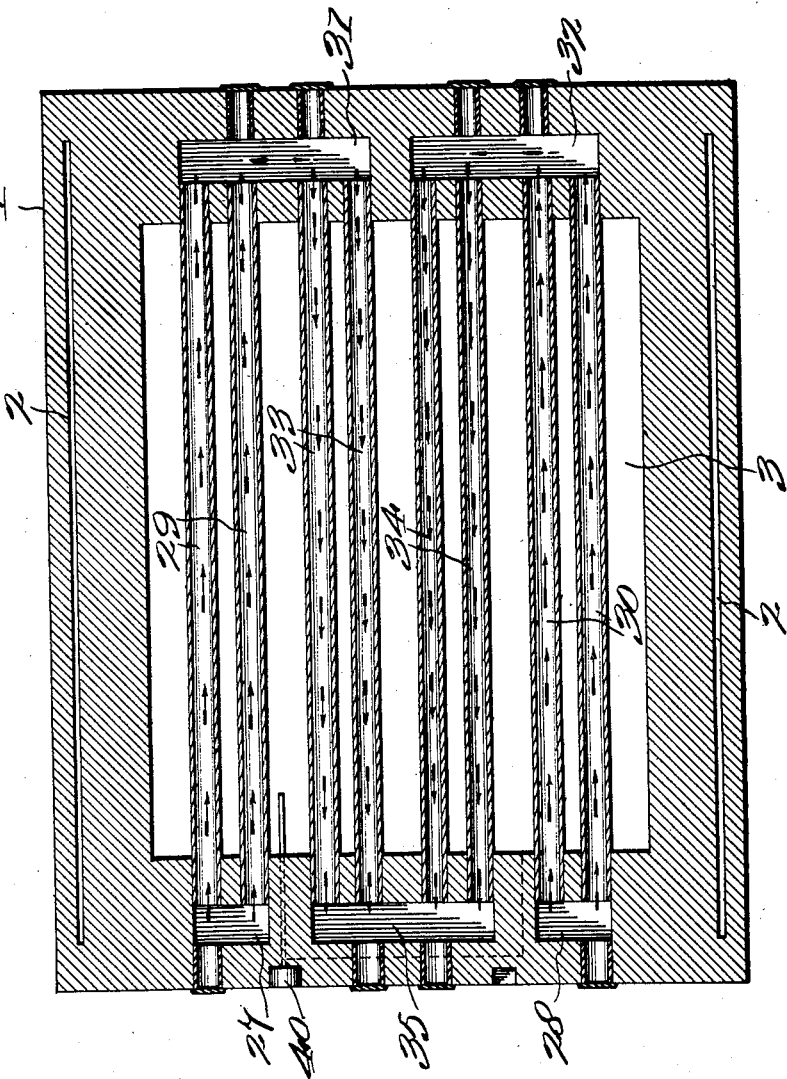

UNITED STATES PATENT OFFICE.

HENRY PARTOLL, OF MISSOULA, MONTANA.

BAKE-OVEN.

1,334,115.                    Specification of Letters Patent.    Patented Mar. 16, 1920.

Application filed September 25, 1915. Serial No. 52,654.

*To all whom it may concern:*

Be it known that I, HENRY PARTOLL, a citizen of the United States, residing at Missoula, in the county of Missoula and State of Montana, have invented certain new and useful Improvements in Bake-Ovens; and I do hereby declare the following to be a full, clear, and exact description of the invention, such as will enable others skilled in the art to which it appertains to make and use the same.

The present invention relates to improvements in bake ovens, and has for an object to provide an improved bake oven which may be quickly fired and heated in condition for operation, and which will be constructed to retain the heat and prevent rapid dissipation thereof.

Another object of the present invention resides in providing an improved bake oven which will be operated at an economy of fuel, and in which there will be a uniform distribution of the heat to the baking chamber.

It is a further object of the present invention to provide a bake oven of simple construction which can be readily built up, and provides access to all parts for cleaning.

Reference is had to the accompanying drawings in which the same parts are indicated by similar reference symbols throughout the several views, and in which:—

Figure 1 is a front elevational view of an improved bake oven constructed in accordance with the present invention;

Fig. 2 is a longitudinal central sectional view of the same;

Fig. 3 is a transverse sectional view taken on the line 3—3 in Fig. 5;

Fig. 4 is a horizontal sectional view taken on the line 4—4 in Fig. 3;

Fig. 5 is a similar view taken on the line 5—5 in Fig. 2; and

Fig. 6 is a sectional view taken on the line 6—6 in Fig. 2.

Referring more particularly to the drawings, 1 designates the oven structure which is preferably of common brick, as indicated in Fig. 1, and the same is formed with longitudinal air spaces 2 in proximity to the outer side walls to compensate for the unequal expansion and contraction of the material.

The baking chamber 3 is formed substantially centrally within the brick structure 1, and as shown in Fig. 1 has a tapering mouth 4 closed by a door 5, hinged to swing in a frame 6, on trunnions 7 and 8; the latter trunnion 8 being extended beyond the door frame 6 and curved to provide an arm 9 carrying a counterweight 10, for assisting in opening the door to introduce the material to the baking chamber.

The floor of the baking chamber 3 is advantageously formed by assembling bricks 11 (see Fig. 2) on a layer of coarse sand 12, which latter is arranged to receive the heat from the fire box below and uniformly distribute the same to all parts of the baking chamber 3.

The fire box is formed in the brick structure 1, beneath the chamber 3, and receives the fire bars 13, the same being supported at their forward ends on a transverse rod 14, supported in the walls of the ash-pit 15, and at their rear ends on a shoulder formed in the upper edge of the rear wall of said ash-pit, as clearly disclosed in Fig. 2.

The fire box and ash-pit are accessible, respectively, through doors 16 and 17 mounted in a common frame 18, fitted within a recess in the front wall of the structure 1, as appears from Fig. 2.

Referring now to Fig. 4, the fire box communicates directly with a central flue 19, leading to the rear of the structure 1, where it connects through transverse flues 20 and 21 with lateral flues 22 and 23, respectively. The several flues are lined with fire brick, or other refractory material 24, and the lateral flues 22 and 23 are accessible for cleaning through plugs 25 and 26 inserted in openings in the front wall of the brick structure 1.

At their front ends the lateral flues 22 and 23 connect with vertical flaring passages 27 and 28, as more fully appear in Figs. 3 and 6; and said passages are in communication with the forward ends of pairs of metallic pipes 29 and 30, supported above the baking chamber 3. Transverse chambers 31 and 32 receive the rear ends of said pairs of pipes 29 and 30, and from the same the products of combustion are delivered to other similar pairs of metallic pipes 33 and 34, supported between the pipes 29 and 30 and communicating at their forward ends with a chimney 35. The several vertical passages 27 and 28 and chambers 31, 32 and 35 are provided with cleaning plugs, as will clearly appear from an inspection of Fig. 6, and it will be readily understood that such plugs may be withdrawn and accumulated matter removed from the pipes, chambers and various other parts.

Above the several sets of pipes is mounted a metallic sheet 36, forming the roof of the baking chamber 3, which is covered over with fire or other brick 37. The top of the structure 1 is built to form a trough for receiving the coarse sand 38, which receives the heat ascending through the various parts of the oven, and prevents the rapid dissipation thereof.

The oven is preferably fired with wood, which is placed on the grate bars 14, and the flames and other products of combustion pass through the several flues and pipes in that manner indicated by the arrows in the several figures. This zig-zag course directs the heat to all parts of the structure 1 about the baking chamber 3, and the layer of sand 12 receives the heat from beneath and tends to promote a more even distribution of the same to all parts of the baking chamber.

The usual damper 39 is placed in the chimney 35, and a pyrometer 40 is mounted in the front wall of the oven adjacent the door 5 of the baking chamber.

It will be obvious that various modifications may be made in the herein described construction, and in the combination and arrangement of parts without departing from the spirit of my invention.

I claim:—

1. A bake oven comprising a rectangular structure made of refractory heat insulating material having longitudinal air spaces in proximity to the outer side walls thereof, a baking chamber provided in said structure, a fire box beneath said baking chamber, a layer of coarse sand between said fire box and baking chamber, a layer of bricks assembled on said sand and forming a floor for the baking chamber, an intermediate flue extending rearwardly from said fire box, cross passages connected with the rear end of said flue, a lateral flue to each side of said intermediate flue and communicating therewith at its rear end each by one of said passages, a vertically-disposed duct flaring upwardly at each forward end of said lateral flues, a pair of metallic pipes fitted at their forward ends in each of said ducts and through the baking chamber, a transverse chamber at each side of the rear of said structure receiving each the rear end of one pair of said pipes, a second pair of metallic pipes running through the baking chamber at each side of the center thereof and with their rear ends fitted one pair in each of said transverse chambers, a chimney connecting the forward ends of said last-mentioned pairs of pipes, and a metallic sheet immediately above said several pipes and forming the roof of the baking chamber, substantially as described.

2. A baking oven comprising a rectangular structure made of refractory heat insulating material having longitudinal air spaces in proximity to the outer side walls thereof, a baking chamber formed therein, a fire box located beneath said chamber, a layer of coarse sand between said fire box and baking chamber, a layer of bricks assembled on said sand and forming a floor for the baking chamber, an intermediate and rearwardly directed flue extending from said fire box, a pair of lateral flues, passages connecting the rear ends of said intermediate and lateral flues, a series of pipes extending through said baking chamber and arranged in side and intermediate pairs, upwardly flaring vertical ducts connecting the forward ends of said lateral flues and side pairs of pipes, transverse chambers connecting the rear ends of the side and intermediate pairs of pipes, plugs for giving access to said pipes, a chimney in communication with the forward ends of said intermediate pairs of pipes, a metallic sheet disposed above said pipes and forming the baking chamber roof, an open trough formed in the top of said structure and covering substantially the entire top thereof, and a heat insulating material in said trough, substantially as described.

In testimony whereof, I affix my signature.

HENRY PARTOLL.